United States Patent
Nagayasu et al.

(10) Patent No.: US 9,458,387 B2
(45) Date of Patent: Oct. 4, 2016

(54) ACTIVATED FISCHER-TROPSCH SYNTHESIS REACTION CATALYST AND METHOD FOR PRODUCING HYDROCARBONS

(75) Inventors: Yoshiyuki Nagayasu, Tokyo (JP); Hideki Ono, Tokyo (JP); Kazuaki Hayasaka, Tokyo (JP); Mayumi Yokoi, Tokyo (JP)

(73) Assignees: Japan Oil, Gas and Metals National Corporation, Tokyo (JP); INPEX CORPORATION, Tokyo (JP); JX Nippon Oil & Energy Corporation, Tokyo (JP); Japan Petroleum Exploration Co., Ltd., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 35 days.

(21) Appl. No.: 14/007,396

(22) PCT Filed: Mar. 14, 2012

(86) PCT No.: PCT/JP2012/056567
§ 371 (c)(1),
(2), (4) Date: Sep. 25, 2013

(87) PCT Pub. No.: WO2012/132905
PCT Pub. Date: Oct. 4, 2012

(65) Prior Publication Data
US 2014/0018454 A1 Jan. 16, 2014

(30) Foreign Application Priority Data
Mar. 31, 2011 (JP) ................ 2011-079049

(51) Int. Cl.
*B01J 21/00* (2006.01)
*C07C 27/00* (2006.01)
(Continued)

(52) U.S. Cl.
CPC .............. *C10G 2/332* (2013.01); *B01J 21/066* (2013.01); *B01J 23/005* (2013.01); *B01J 23/75* (2013.01); *B01J 35/002* (2013.01); *B01J 37/18* (2013.01); *B01J 21/08* (2013.01)

(58) Field of Classification Search
CPC ....... C10G 2/332; B01J 21/066; B01J 23/75; B01J 35/002; B01J 37/18; B01J 23/005; B01J 21/08
USPC .......................................... 502/242; 518/715
See application file for complete search history.

(56) References Cited

U.S. PATENT DOCUMENTS

| | | |
|---|---|---|
| 4,499,209 A | 2/1985 | Hoek et al. |
| 4,568,663 A | 2/1986 | Mauldin |

FOREIGN PATENT DOCUMENTS

| | | |
|---|---|---|
| CN | 101020137 A | 8/2007 |
| CN | 101052466 A | 10/2007 |

(Continued)

OTHER PUBLICATIONS

Tao et al. "Effect of isomorphic substitution of zirconium on mesoporous silica as support for cobalt Fischer—Tropsch synthesis catalysts", Aug. 11, 2010, Journal of Molecular Catalysis A: Chemical vol. 331, Issues 1-2, Oct. 1, 2010, pp. 50-57.*

(Continued)

*Primary Examiner* — Colleen Dunn
*Assistant Examiner* — Haytham Soliman
(74) *Attorney, Agent, or Firm* — Panitch Schwarze Belisario & Nadel LLP

(57) ABSTRACT

A Fischer-Tropsch synthesis reaction catalyst includes a catalyst support containing a silica and zirconium oxide in an amount of 0.5 to 14% by mass based on the mass of the catalyst support, and cobalt metal and a cobalt oxide supported on the catalyst support in an amount equivalent to 10 to 40% by mass of tricobalt tetroxide based on the mass of the catalyst, wherein the degree of reduction of the cobalt atoms is within a range from 75 to 93%, and the amount of hydrogen gas adsorption per unit mass of the catalyst at 100° C. is within a range from 0.40 to 1.0 ml/g.

4 Claims, 1 Drawing Sheet

(51) Int. Cl.
*C10G 2/00* (2006.01)
*B01J 21/06* (2006.01)
*B01J 23/00* (2006.01)
*B01J 23/75* (2006.01)
*B01J 35/00* (2006.01)
*B01J 37/18* (2006.01)
*B01J 21/08* (2006.01)

(56) References Cited

FOREIGN PATENT DOCUMENTS

| CN | 101269329 A | 9/2008 |
|---|---|---|
| EP | 1736239 A1 | 12/2006 |
| GB | 2088407 A | 6/1982 |
| JP | S59-102440 A | 6/1984 |
| JP | 2002-501431 A | 1/2002 |
| JP | 2003-500188 A | 1/2003 |
| JP | 2007-537035 A | 12/2007 |
| JP | 2008-073687 A | 4/2008 |
| WO | 9847620 A1 | 10/1998 |
| WO | 0071253 A2 | 11/2000 |
| WO | 2005099897 A1 | 10/2005 |
| WO | 2005107942 A1 | 11/2005 |
| WO | 2008099695 A1 | 8/2008 |
| WO | 2009119977 A2 | 10/2009 |
| WO | 2010049715 A1 | 5/2010 |
| WO | 2011027104 A1 | 3/2011 |

OTHER PUBLICATIONS

Office Action issued Sep. 25, 2014 in CN Application No. 201280015470.4.
Int'l Search Report issued Jun. 19, 2012 in Int'l Application No. PCT/JP2012/056567.
Ali et al, "Zr Promotion of Co/SiO2 for Fischer-Tropsch Synthesis," Journal of Catalysis, vol. 157, No. 1, pp. 35-41 (Nov. 1995).
Feller et al, "Cobalt Cluster Effects in Zirconium Promoted Co/SiO2 Fischer-Tropsch Catalysts," Journal of Catalysis, vol. 185, No. 1, pp. 120-130 (Jul. 1, 1999).
Extended European Search Report issued Dec. 15, 2014 in EP Application No. 12763133.1.

* cited by examiner

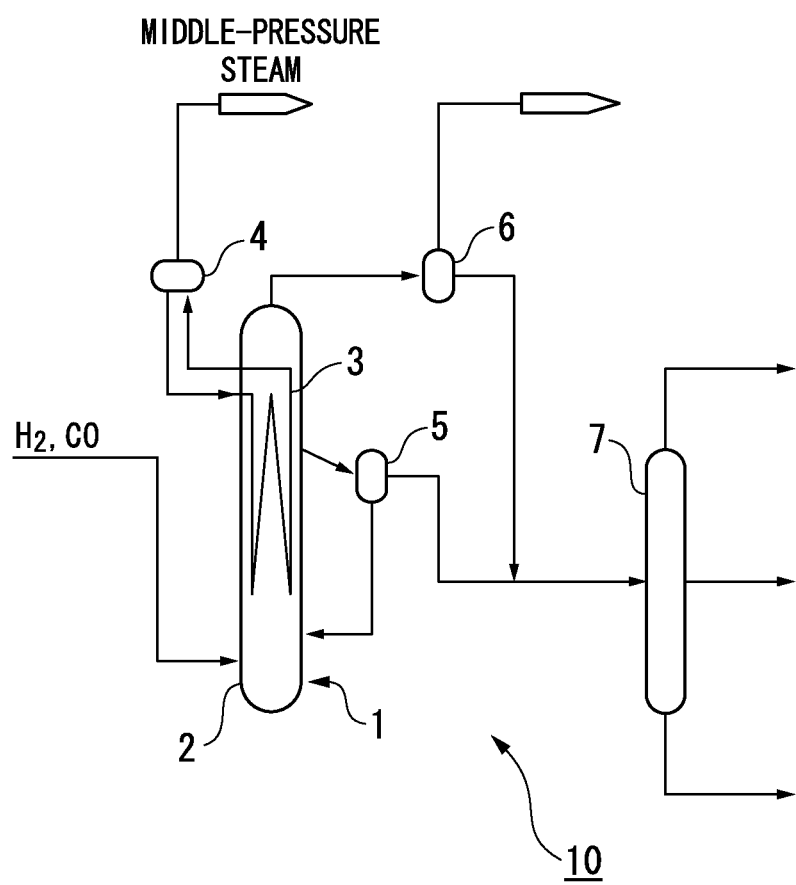

ACTIVATED FISCHER-TROPSCH SYNTHESIS REACTION CATALYST AND METHOD FOR PRODUCING HYDROCARBONS

CROSS-REFERENCE TO RELATED APPLICATION

This application is a Section 371 of International Application No. PCT/JP2012/056567, filed Mar. 14, 2012, which was published in the Japanese language on Oct. 4, 2012, under International Publication No. WO2012/132905 A1, and the disclosure of which is incorporated herein by reference.

TECHNICAL FIELD

The present invention relates to an activated catalyst used in a Fischer-Tropsch synthesis reaction, and a method for producing hydrocarbons that uses the catalyst.

Priority is claimed on Japanese Patent Application No. 2011-079049, filed Mar. 31, 2011, the content of which is incorporated herein by reference.

BACKGROUND ART

In recent years, the regulations relating to the sulfur fraction and aromatic hydrocarbon fraction within liquid fuels such as gasoline and gas oil have rapidly become more and more strict. Accordingly, the production of so-called environmentally-friendly, clean liquid fuels having a low sulfur content and low aromatic hydrocarbon content has become essential. One method for producing these types of clean fuels is a method that utilizes the so-called Fischer-Tropsch synthesis reaction (hereinafter frequently abbreviated as the "FT synthesis reaction") in which carbon monoxide is reduced using hydrogen (hereinafter this method is frequently referred to as the "FT synthesis method").

The catalyst used in the FT synthesis reaction (hereinafter frequently referred to as the "FT synthesis catalyst") is generally a catalyst in which an active metal such as iron, cobalt or ruthenium, and particularly cobalt, is supported on a porous inorganic oxide such as silica or alumina.

The above-mentioned FT synthesis catalyst is generally prepared in the manner described below. Namely, a cobalt compound such as cobalt nitrate is first supported on a catalyst support composed of a porous inorganic oxide such as silica or alumina by an impregnation method that uses an aqueous solution of the cobalt compound. The resulting product is then dried and calcined, yielding an FT synthesis catalyst in which a cobalt oxide is supported on the porous inorganic oxide catalyst support. In order to ensure that a catalyst obtained in this manner exhibits sufficient activity relative to the FT synthesis reaction, the catalyst must be reduced within a reducing atmosphere containing hydrogen gas or the like to convert the cobalt atoms of the active metal from an oxide state to a metal state. In the present description, an FT synthesis catalyst that has been activated by this type of reduction treatment is called an "activated Fischer-Tropsch synthesis reaction catalyst" (which hereinafter may also be abbreviated to "activated FT synthesis catalyst").

In order to enable the commercial production of hydrocarbons used in fuels and the like using the FT synthesis method, the development of highly active FT synthesis catalysts is required, and numerous improvements are being made to catalysts composed of cobalt supported on a porous inorganic oxide.

In order to enhance the activity of an activated FT synthesis catalyst, it has conventionally been thought that when the FT synthesis catalyst is subjected to the reduction treatment, the reduction must proceed such that the cobalt atoms that function as the active metal are converted from an oxide state to a state in which the proportion of cobalt atoms in the metal state relative to the total amount of cobalt atoms (namely, the degree of reduction) has been satisfactorily increased, and the metal cobalt particles produced by the reduction must exist in a highly dispersed state, namely, agglomeration of the cobalt metal particles must be suppressed so that the metallic cobalt exists as very fine particles.

For example, it has been reported that by using a catalyst support in which an oxide of zirconium or titanium has been supported on a porous inorganic oxide such as silica or alumina, the catalytic activity can be increased (for example, see Patent Document 1). It is thought that this increase in activity is because the action of the oxide of zirconium or titanium supported on the catalyst support causes an increase in the dispersion of the cobalt metal particles.

Further, it has also been reported that by using a catalyst support in which a thin film of an oxide of zirconium or titanium has been supported on a porous inorganic oxide such as silica or alumina, the catalytic activity can be increased even further, and an FT synthesis catalyst is obtained that exhibits excellent chain growth probability in the FT synthesis reaction (for example, see Patent Document 2).

However, in these methods in which an oxide of zirconium or titanium is supported on a porous inorganic oxide such as silica or alumina, even though an improvement in the dispersion of the cobalt metal particles is achieved, increasing the degree of reduction of the cobalt atoms has been difficult. In order to increase the degree of reduction of the cobalt atoms, the temperature during the catalyst reduction treatment must generally be increased. However, in this case, the increase in the degree of reduction tends to be accompanied by increased agglomeration of the cobalt metal particles and decreased dispersion of the metal particles. Accordingly, further improvements in the activity have proven difficult.

On the other hand, it has been reported that in an FT synthesis catalyst having both cobalt and rhenium supported on the catalyst as active metals, a combination of a high degree of reduction for the cobalt atoms and superior dispersion of the metal particles can be achieved (for example, see Patent Document 3). However, rhenium is a very expensive metal, and the resulting increase in the catalyst costs for the FT synthesis method is problematic.

As a result, it has been reported that by including a saccharide when the cobalt is supported on the catalyst support, thereby enhancing the dispersion of the cobalt metal particles, a combination of a high degree of reduction for the cobalt atoms and superior dispersion of the metal particles can be achieved even if the amount of supported rhenium is reduced significantly (for example, see Patent Document 4).

CITATION LIST

Patent Documents

Patent Document 1: Japanese Unexamined Patent Application, First Publication No. Sho 59-102440
Patent Document 2: International Patent Publication No. WO 2005/099897 pamphlet Patent Document 3: U.S. Pat. No. 4,568,663
Patent Document 4: Published Japanese Translation of PCT No. 2002-501431

SUMMARY OF INVENTION

Technical Problem

However, in the above technique wherein a saccharide is used as a dispersant, in order to achieve a combination of a high degree of reduction for the cobalt atoms and superior dispersion of the metal particles, and impart the resulting activated FT synthesis catalyst with a high degree of activity, rhenium must still be supported on the catalyst, albeit at a reduced amount. Accordingly, the problem of increased catalyst costs remains, and further reductions in these catalyst costs is desirable.

The present invention has been developed in light of the above problems associated with the conventional technology, and has an object of providing an activated FT synthesis catalyst that exhibits excellent reaction activity without using expensive metals such as rhenium, and a method for producing hydrocarbons that uses this catalyst.

Solution to Problem

As a result of intensive research aimed at achieving the above object, the inventors of the present invention discovered that an activated FT synthesis catalyst having a specific composition and structure exhibited superior activity relative to the FT synthesis reaction, and that this type of activated FT synthesis catalyst could be obtained by employing a specific production method, and they were therefore able to complete the present invention.

In other words, an activated Fischer-Tropsch synthesis reaction catalyst according to the present invention includes a catalyst support containing a silica and zirconium oxide in an amount of 0.5 to 14% by mass based on the mass of the catalyst support, and cobalt metal and a cobalt oxide supported on the catalyst support in an amount equivalent to 10 to 40% by mass of tricobalt tetroxide based on the mass of the catalyst, wherein the degree of reduction of the cobalt atoms, represented by formula (1) shown below, is within a range from 75 to 93%, and the amount of hydrogen gas adsorption per unit mass of the catalyst at 100° C. is within a range from 0.40 to 1.0 ml/g.

$$\text{Degree of reduction of cobalt atoms (\%)} = \frac{100 \times [\text{mass of metal cobalt atoms}]}{\text{total mass of all cobalt atoms}} \quad (1)$$

Measurement of the degree of reduction of the cobalt atoms is performed using a method that employs the TPR (Temperature Programmed Reduction) measurement method, which is described below in detail. Further, the term "catalyst" that is used as the basis for the amount of supported cobalt and the amount of hydrogen gas adsorption refers to the FT synthesis catalyst when the cobalt atoms are all in the oxide state, namely, the FT synthesis catalyst prior to activation by the reduction treatment in the production method described below.

The activated Fischer-Tropsch synthesis reaction catalyst according to the present invention has a high amount of hydrogen gas adsorption per unit mass of the catalyst and contains cobalt metal particles that are finely dispersed, and therefore exhibits excellent activity relative to the FT synthesis reaction even though the degree of reduction of the cobalt atoms represented by the above formula (1) is not particularly high.

In the Fischer-Tropsch synthesis reaction catalyst of the present invention, the amount of hydrogen gas adsorption per unit mass of the cobalt metal at 100° C. may be within a range from 3.4 to 5.0 ml/g.

By ensuring that the Fischer-Tropsch synthesis reaction catalyst of the present invention satisfies the above structural requirement, even better activity can be achieved relative to the FT synthesis reaction.

In the Fischer-Tropsch synthesis reaction catalyst of the present invention, the value obtained by multiplying the above-mentioned degree of reduction of the cobalt atoms by the above-mentioned amount of hydrogen gas adsorption per unit mass of the cobalt metal at 100° C. may be within a range from 290 to 350.

By ensuring that the Fischer-Tropsch synthesis reaction catalyst of the present invention satisfies the above structural requirement, even better activity can be achieved relative to the FT synthesis reaction.

A method for producing hydrocarbons according to the present invention includes subjecting a feedstock containing carbon monoxide gas and hydrogen gas to the Fischer-Tropsch synthesis reaction in the presence of the above-mentioned activated Fischer-Tropsch synthesis reaction catalyst according to the present invention.

Because the method for producing hydrocarbons according to the present invention uses the above-mentioned highly active FT synthesis catalyst, hydrocarbons can be produced with good efficiency.

Advantageous Effects of Invention

The present invention provides an activated FT synthesis catalyst that exhibits excellent reaction activity without using expensive metals such as rhenium, and also provides a method for producing hydrocarbons in which, by using this catalyst, hydrocarbons used in fuel oils and the like can be produced with good efficiency.

BRIEF DESCRIPTION OF THE DRAWINGS

FIG. 1 is a schematic diagram illustrating one example of an FT synthesis unit, which is used in a method of producing hydrocarbons according to the present invention, and includes a slurry bubble column reactor as the main component.

DESCRIPTION OF EMBODIMENTS

The present invention is described below in detail based on a preferred embodiment. In this description, unless stated otherwise, the activity of the activated FT synthesis catalyst (activated Fischer-Tropsch synthesis reaction catalyst) relative to the FT synthesis reaction refers to the conversion rate of carbon monoxide in the initial stage of the reaction.

First is a description of a method for producing the activated FT synthesis catalyst according to the present invention.

First, the catalyst support is prepared. There are no particular limitations on the silica-containing particles used in the method for producing the activated FT synthesis catalyst according to the present embodiment, and examples include silica particles, and silica particles that contain a small amount of an inorganic oxide such as alumina, boria, titania or magnesia, and/or a metal component such as an alkali metal, an alkaline earth metal or hafnium or the like. Of these, silica particles are preferred. Further, although there are no particular limitations on the properties of the silica-containing particles, the specific surface area measured by a nitrogen adsorption method is preferably within a range from 100 to 500 m$^2$/g, and more preferably from 200 to 400 m$^2$/g. Furthermore, the average pore size within the silica-containing particles, measured by a nitrogen adsorption method, is preferably within a range from 8 to 20 nm, more preferably from 10 to 18 nm, and still more preferably from 11 to 16 nm. Moreover, although there are no particular limitations on the shape of the silica-containing particles, if due consideration is given to practical applicability, then the types of particle shapes typically used in petroleum refining apparatus or petrochemical apparatus, including spherical particles, circular cylindrical particles, and cylindrical particles having a modified cross-section in the shape of a three-leaf or four-leaf clover, are preferred. Moreover, although there are no particular limitations on the size of the particles, from a practical viewpoint, the size is preferably within a range from 10 μm to 10 mm. If the catalyst is to be used within a slurry bubble column reactor, which is ideal for performing the FT synthesis reaction, then from the viewpoint of ensuring favorable fluidity for the catalyst, the catalyst is preferably composed of spherical particles, and the average particle size is preferably within a range from 10 to 300 μm, and more preferably from 30 to 150 μm.

In the method for producing the activated FT synthesis catalyst according to the present invention, the above silica-containing particles are first subjected to a pretreatment by dipping the particles in water or an aqueous solution containing an acid to remove any gas bubbles that exist within the particle pores. The water is preferably an ion-exchanged water or distilled water. Further, an aqueous solution containing an acid refers to an aqueous solution of an inorganic acid such as nitric acid, hydrochloric acid or sulfuric acid, or an organic acid such as formic acid, acetic acid or citric acid. The pH of the acid-containing aqueous solution is preferably within a range from 5 to 7, and more preferably from 6 to 7. If the pH is less than 5, then during the supporting of the zirconium compound on the catalyst support that is performed after the pretreatment, the concentration of the zirconium compound solution used in supporting the required amount of the zirconium compound must be increased, which is economically undesirable.

In order to remove the gas bubbles that exist within the pores of the silica-containing particles during the dipping in the water or the aqueous solution containing an acid (hereinafter also referred to as "the pretreatment liquid"), the pretreatment liquid may be left still, but in order to enable more efficient removal of the gas bubbles, a method in which the pretreatment liquid is stirred, a method in which the pretreatment liquid is vibrated, a method in which the degassing is performed with the pretreatment liquid under reduced pressure, or a method in which the pretreatment liquid is irradiated with ultrasound is preferred. Of these methods, a method in which the pretreatment liquid is irradiated with ultrasound yields reliable removal of the gas bubbles in a short period of time, and is consequently preferred. The ultrasound irradiation my be performed for a period of 1 minute to several hours.

Subsequently, a zirconium compound is supported on the pretreated silica-containing particles. This supporting is preferably performed by removing the supernatant pretreatment liquid, adding a solution of the zirconium compound to the container holding the silica-containing particles, and then using a so-called equilibrium adsorption method to adsorb the zirconium compound to the silica-containing particles.

Examples of compounds that may be used favorably as the zirconium compound undergoing supporting include zirconium oxychloride ($ZrOCl_2$), zirconium hydroxy oxychloride ($ZrO(OH)Cl$), Zirconyl sulfate ($ZrOSO_4$), zirconyl nitrate ($ZrO(NO_3)_2$), zirconyl acetate ($ZrO(C_2H_3O_2)_2$) and ammonium tricarbonatozirconate (($NH_4)_2ZrO(CO_3)_2$). Among these compounds, zirconyl acetate and ammonium tricarbonatozirconate are more preferred, and ammonium tricarbonatozirconate is particularly desirable. The solvent used in the zirconium compound solution may be either water or an organic solvent, but water is preferred.

The amount added of the zirconium compound solution during the above supporting treatment (including the residual water or acid-containing aqueous solution used in the pretreatment) is preferably sufficient to completely immerse the total mass of the silica-containing particles, and is preferably at least two times the apparent volume occupied by the silica-containing particles. Further, the amount of the zirconium compound dissolved in the zirconium compound solution is preferably an excess relative to the amount of zirconium that is to be supported on the silica-containing particles. The concentration of the zirconium compound solution is preferably set by first determining the relationship between the concentration of the zirconium compound solution and the amount of equilibrium adsorption of the zirconium compound on the silica-containing particles, and then selecting a concentration that yields an amount of equilibrium adsorption equal to the desired amount of supported zirconium. The concentration of the zirconium compound solution is generally within a range from approximately 0.03 to 3 mol/L.

Although there are no particular limitations on the temperature during the supporting treatment, room temperature or a similar temperature is preferred. There are no particular limitations on the time taken for the supporting treatment, which varies depending on the temperature, but the time is preferably longer than the time required for the adsorption of the zirconium compound to the silica-containing particles to reach equilibrium. When the supporting of the zirconium compound by adsorption is performed at room temperature, a time of approximately one day is preferred. The supporting treatment may be performed with or without stirring.

The amount of zirconium supported on the silica-containing particles, based on the mass of the prepared catalyst support (namely, the combined mass of the silica-containing particles and the mass of the zirconium compound supported on the particles) and calculated as an equivalent amount of zirconium oxide, is typically within a range from 0.5 to 14% by mass, preferably from 0.5 to 8% by mass, and more preferably from 0.5 to 6% by mass. If this amount of supported zirconium is less than 0.5% by mass, then the effect achieved by supporting the zirconium oxide on the silica-containing particles, namely the improvement in the activity of the activated FT synthesis catalyst, tends to be unsatisfactory. In contrast, if the amount of supported zirconium exceeds 14% by mass, then the dispersion of the cobalt metal particles within the activated FT synthesis catalyst tends to be unsatisfactory, and the degree of reduction of the cobalt atoms tends not to increase satisfactorily, meaning the activity of the catalyst tends to deteriorate.

Following supporting of the zirconium compound, the solution containing the zirconium compound used during the supporting treatment, and the silica-containing particles having the zirconium compound supported thereon are separated using a solid-liquid separation technique such as filtration. Following separation, the silica-containing particles having the zirconium compound supported thereon are preferably washed with ion-exchanged water or distilled water or the like until the wastewater following washing has a pH of approximately 7. Subsequently, the silica-containing particles having the zirconium compound supported thereon are preferably dried. There are no particular limitations on the drying method used, and suitable methods include drying under heat in the open air, or drying and degassing under reduced pressure. Drying is typically performed at a temperature of 100 to 140° C., and preferably a temperature of 110 to 130° C., for a period of 2 to 24 hours, and preferably 5 to 12 hours.

Next, the silica-containing particles having the zirconium compound supported thereon are subjected to calcination to convert the zirconium compound to zirconium oxide and obtain the catalyst support. There are no particular limitations on the calcination method, but the calcination is preferably conducted in an atmosphere containing molecular oxygen, and most preferably in an air atmosphere. The calcination temperature is typically within a range from 200 to 600° C., and the calcination treatment time is typically from 1 to 10 hours. If the calcination temperature is less than 200° C., then the zirconium compound supported on the silica-containing particles tends to not undergo satisfactory oxidative decomposition, and is therefore not converted satisfactorily to zirconium oxide. In contrast, if the calcination temperature exceeds 600° C., then favorable dispersion of the cobalt metal particles within the activated FT synthesis catalyst formed from the obtained catalyst support cannot be achieved, and a satisfactory improvement in the activity of the catalyst relative to the FT synthesis reaction tends to be unobtainable.

In the catalyst support prepared in the manner described above and containing zirconium oxide supported on the silica-containing particles, it is thought that the zirconium oxide does not agglomerate, but is rather supported as a uniform thin film on the surfaces of the pores of the silica-containing particles. By using this catalyst support, in which it is thought that the zirconium oxide is supported on the silica-containing particles in the thin film configuration described above, supporting cobalt on the catalyst support as an active metal to prepare an FT synthesis catalyst, and then reducing the FT synthesis catalyst to prepare an activated FT synthesis catalyst, an activated FT synthesis catalyst can be obtained which has excellent FT synthesis reaction activity, and in which the cobalt metal particles are finely dispersed.

Next, the cobalt that functions as the active metal is supported on the catalyst support to prepare a catalyst precursor. A cobalt compound is used in this cobalt supporting treatment. There are no particular limitations on the cobalt compound used for supporting the cobalt on the catalyst support, and examples of compounds that may be used include inorganic and organic acid salts of cobalt and cobalt complexes. Specific examples of the cobalt compound include cobalt nitrate, cobalt chloride, cobalt formate, cobalt acetate, cobalt propionate, and cobalt acetylacetonate. Among these, cobalt nitrate is preferred.

The amount of the cobalt compound supported on the catalyst support, namely the amount of supported cobalt, based on the mass of the prepared FT synthesis catalyst and calculated as an equivalent mass of tricobalt tetroxide, is within a range from 10 to 40% by mass. If this amount is less than 10% by mass, then the activity of the catalyst tends to be lacked. In contrast, if the amount exceeds 40% by mass, then agglomeration of the cobalt metal particles becomes increasingly likely within the obtained activated FT synthesis catalyst, meaning the activity of the catalyst relative to the FT synthesis reaction tends to deteriorate. There are no particular limitations on the method used for supporting the cobalt compound, and for example, an impregnation method typified by the Incipient Wetness method may be used, in which a solution, and preferably an aqueous solution, of an above-mentioned cobalt compound is used as the impregnating solution.

Other metals besides cobalt may be supported on the catalyst support in combination with cobalt as the active metal, including other metals that exhibit FT synthesis reaction activity such as iron or ruthenium, and other metal components such as rhenium and hafnium that are known to exhibit specific effects in terms of improving the catalytic activity, suppressing deterioration in the catalytic activity over time, or improving the chain growth probability of the produced hydrocarbons. However, if very expensive metals such as rhenium are supported on the catalyst support, then the cost of the resulting catalyst increases, making it difficult to achieve the specified object of the present invention, and therefore these types of expensive metals are preferably either not used, or used in only very small amounts.

Following supporting of the cobalt compound on the catalyst support, drying is performed at a temperature of 100 to 150° C., and preferably 110 to 130° C., for a period of 2 to 24 hours, and preferably approximately 5 to 10 hours, thus forming a catalyst precursor.

Next, the catalyst precursor is calcined in an atmosphere containing molecular oxygen, and preferably an air atmosphere, at a temperature of 250 to 600° C. for a period of approximately 1 to 10 hours, thereby converting the cobalt compound to an oxide of cobalt (cobalt oxide). In this manner, an FT synthesis catalyst is obtained.

The FT synthesis catalyst obtained in this manner, having cobalt atoms in an oxide state, exhibits relatively low activity relative to the FT synthesis reaction without further modification. Accordingly, an activation treatment is performed by reducing this FT synthesis catalyst to convert at least a portion of the cobalt oxide into cobalt metal (metallic cobalt), and the resulting activated FT synthesis catalyst can then be used in the FT synthesis reaction. In other words, in the present embodiment, by reducing the above-mentioned FT synthesis catalyst, an activated FT synthesis catalyst containing both cobalt metal and cobalt oxide supported on the above-mentioned catalyst support, namely an activated FT synthesis catalyst that represents one embodiment of the present invention, can be prepared.

The reduction of the FT synthesis catalyst is preferably performed in an atmosphere containing hydrogen gas. Examples of this hydrogen gas-containing atmosphere include a hydrogen gas atmosphere and a gas atmosphere containing hydrogen gas diluted with an inert gas such as nitrogen gas. A hydrogen gas atmosphere is preferred.

The temperature during the reduction treatment is typically within a range from 300 to 380° C., and preferably from 330 to 370° C. If the temperature is lower than 300° C., then obtaining the required degree of reduction of the cobalt atoms in an efficient manner tends to be difficult. In contrast, if the temperature exceeds 380° C., then flocculation of the cobalt metal particles produced by the reduction tends to occur, resulting in a deterioration in the activity.

The time of the reduction treatment is typically determined in accordance with the temperature, but is also dependent upon the configuration of the apparatus being used, and therefore cannot be readily specified. However, the time is generally within a range from 1 to 20 hours, and preferably from 1 to 10 hours. Here, the "time of the reduction treatment" refers to the time from the point where the catalyst has reached a predetermined temperature.

There is concern that the activated FT synthesis catalyst obtained in the manner described above may lose activity upon exposure to air as a result of oxidation of the cobalt metal. Accordingly, in those cases where the activated FT synthesis catalyst may be exposed to air, such as cases where the catalyst production facility and the facility for executing the FT synthesis method using the catalyst are distant from one another and the activation of the catalyst by reduction is performed within the catalyst production facility, it is preferable that the activated FT synthesis catalyst is subjected to a stabilization treatment, prior to transport, which prevents deterioration in the activity of the activated FT synthesis even if exposed to air. Specific examples of this stabilization treatment include a method in which the outer surface of the activated FT synthesis catalyst is coated with a wax or the like to prevent contact with the air, and a method in which the outer surface of the activated FT synthesis catalyst is allowed to lightly oxidize, thereby forming an oxide layer that prevents further oxidation caused by contact with the air. The activated FT synthesis catalyst according to the present invention includes activated FT synthesis catalysts that have been subjected to these types of stabilization treatments.

The method described above yields an activated FT synthesis catalyst of the present embodiment.

For the activated FT synthesis catalyst of the present embodiment, the amount of hydrogen gas adsorption per unit mass of the catalyst at 100° C. is preferably within a range from 0.40 to 1.0 ml/g, and more preferably from 0.50 to 0.85 ml/g. This amount of hydrogen gas adsorption is an indicator of the dispersion of the cobalt metal particles contained within the activated FT synthesis catalyst, and a larger value for this amount indicates a larger amount of hydrogen gas adsorbed to the surface of the cobalt metal particles, and consequently a more favorable dispersion of the cobalt metal particles.

Measurement of the amount of hydrogen gas adsorption at 100° C. for the activated FT synthesis catalyst according to the present embodiment is performed in the manner described below, using a metal dispersion degree analyzer (BEL-METAL-3, manufactured by Bel Japan, Inc.). First, the catalyst to be measured (the FT synthesis catalyst obtained following supporting of the cobalt compound and calcination, but prior to the reduction treatment) is weighed and placed in the metal dispersion degree analyzer, and a reduction treatment is then performed in a hydrogen gas atmosphere under the same conditions as those employed for the reduction treatment used in producing the activated FT synthesis catalyst. The sample of the activated FT synthesis catalyst prepared inside the metal dispersion degree analyzer is then cooled to room temperature, and following subsequent heating again to the measurement temperature of 100° C., hydrogen gas is adsorbed onto the catalyst, and the amount of adsorbed hydrogen gas is measured. This amount of adsorbed hydrogen gas is divided by the mass of the initially weighed FT synthesis catalyst to calculate the amount of hydrogen gas adsorption per unit mass of the catalyst.

The degree of reduction of the cobalt atoms contained within the activated FT synthesis catalyst of the present embodiment, namely the degree of reduction of cobalt atoms represented by the following formula (1) is preferably within a range from 75 to 93%, and more preferably from 80 to 93%.

$$\text{Degree of reduction of cobalt atoms (\%)} = \frac{100 \times [\text{mass of metal cobalt atoms}]}{\text{total mass of all cobalt atoms}} \quad (1)$$

If this degree of reduction is less than 75%, then the activity of the activated FT synthesis catalyst tends to be lower. In contrast, in order to perform a reduction treatment that yields a degree of reduction exceeding 93%, either a high-temperature treatment or a very long treatment is necessary, but if the reduction is performed under such conditions, then the cobalt metal particles contained within the activated FT synthesis catalyst tend to agglomerate, causing the decrease of the catalytic activity.

The degree of reduction of the cobalt atoms incorporated within the activated FT synthesis catalyst is measured in the manner described below, using a TPR measurement apparatus. First, the unreduced FT synthesis catalyst (wherein the cobalt atoms are in an oxide state, degree of reduction: 0%) that functions as a standard sample is subjected to a TPR measurement using the TPR measurement apparatus, and the amount of produced Mass 18 ($H_2O$) is measured. In those cases where the catalyst to be measured is an activated FT synthesis catalyst that has been subjected to a stabilization treatment, a TPR measurement of a sample of the catalyst is performed using the TPR measurement apparatus under the same conditions as those used for the unreduced catalyst, and the amount of Mass 18 is measured. The degree of reduction of the cobalt atoms is then calculated from the ratio of the measured Mass 18 value and the Mass 18 value obtained for the unreduced catalyst. On the other hand, if the catalyst to be measured is a catalyst that has not undergone a stabilization treatment, then the basic unreduced FT synthesis catalyst is first subjected to a reduction treatment inside the TPR measurement apparatus under corresponding reduction conditions, and the measurement apparatus is then cooled while the TPR measurement is performed. The amount of Mass 18 is then measured in the same manner as described above, and the degree of reduction of the cobalt atoms is calculated from the ratio between the measured value and the value for the standard sample.

In the activated FT synthesis catalyst of the present embodiment, the amount of hydrogen gas adsorption per unit mass of the cobalt metal at 100° C. is preferably within a range from 3.4 to 5.0 ml/g. By adopting this type of structure, the catalyst is able to exhibit an even higher level of FT synthesis activity.

The amount of hydrogen gas adsorption per unit mass of the cobalt metal at 100° C. is calculated by dividing the above-mentioned amount of hydrogen gas adsorption per unit mass of the catalyst at 100° C. by the mass of cobalt metal (reduced cobalt metal) contained within each unit mass of the catalyst. The mass of cobalt metal contained within each unit mass of the catalyst is calculated by multiplying the mass of supported $Co_3O_4$ per unit mass of the catalyst by the degree of reduction of the cobalt atoms.

In the Fischer-Tropsch synthesis reaction catalyst according to the present embodiment, the value obtained by multiplying the above-mentioned degree of reduction of the cobalt atoms by the above-mentioned amount of hydrogen gas adsorption per unit mass of the cobalt metal at 100° C. is preferably within a range from 290 to 350, and adopting this type of structure, the catalyst is able to exhibit an even higher level of FT synthesis activity.

As described above, conventionally, it has been thought that in order for an activated FT synthesis catalyst to exhibit a high level of activity relative to the FT synthesis reaction, the degree of reduction of the cobalt atoms must be high and the dispersion of the cobalt metal atoms must be good. However, in the activated FT synthesis catalyst obtained in the present embodiment, although the dispersion of the cobalt metal particles, as indicated by the amount of hydrogen gas adsorption, is extremely good, the degree of reduction of the cobalt atoms is not particularly high compared with conventional techniques. In the present embodiment, by supporting the zirconium compound on the silica-containing particles under specific conditions, and then calcining the resulting product, a catalyst support is obtained in which a large amount of zirconium oxide is supported uniformly, and in the form of a thin film, on the silica-containing particles, and by subsequently supporting a cobalt compound on this catalyst support, performing calcination to obtain an FT synthesis catalyst, and then performing a reduction treatment under specific temperature conditions, the activated FT synthesis catalyst is obtained. Even though an activated FT synthesis catalyst obtained using his type of method does not have a particularly high degree of reduction for the cobalt atoms compared with an activated FT synthesis catalyst obtained using conventional techniques, the inventors of the present invention surmise that because the dispersion of the cobalt metal atoms is extremely good, the catalyst is able to exhibit excellent activity relative to the FT synthesis reaction.

There are no particular limitations on the method for producing hydrocarbons by subjecting a feedstock containing carbon monoxide gas and hydrogen gas to the Fischer-Tropsch synthesis reaction in the presence of the activated Fischer-Tropsch synthesis reaction catalyst of the present embodiment, and examples of methods that may be employed favorably include a method in which the FT synthesis reaction is performed with the catalyst packed into a fixed bed reactor, and a method that uses a slurry bed reactor using a catalyst slurry prepared by suspending the catalyst in a hydrocarbon oil.

A method for producing hydrocarbons using the activated FT synthesis catalyst of the present embodiment is described below using an example that employs a slurry bed reactor.

An FT synthesis unit 10 shown in FIG. 1, containing a slurry bubble column reactor 1 as the main component, can be used as the reaction apparatus. The slurry bubble column reactor 1 is used for synthesizing hydrocarbon compounds from a synthesis gas using the FT synthesis reaction, and includes a reaction column 2 and a cooling line 3. The reaction column 2 is a substantially circular cylindrical container made of metal, inside which is housed a slurry prepared by suspending the activated FT synthesis catalyst obtained in the embodiment described above within a hydrocarbon oil that is liquid at the reaction temperature (typically the hydrocarbon oil produced by the FT synthesis reaction within the same reaction apparatus). A mixed gas containing carbon monoxide gas and hydrogen gas (typically a synthesis gas obtained by reforming the hydrocarbons of a natural gas or the like) is introduced into the reaction column 2 from a position near the bottom of the column. The mixed gas forms gas bubbles that gradually dissolve in the hydrocarbon oil during their ascent up the inside of the column, and is converted to hydrocarbons by contact with the activated FT synthesis catalyst.

In other words, the carbon monoxide gas and the hydrogen gas contained in the mixed gas dissolve in the liquid hydrocarbon oil, and then undergo reaction with each upon contact with the catalyst particles, thus producing hydrocarbon compounds (the FT synthesis reaction). Further, because the mixed gas forms gas bubbles that ascend up the inside the reaction column 2, a rising current (air lift) is generated within the catalyst slurry inside the reaction column 2. This air lift causes circulation of the catalyst slurry. Unreacted mixed gas that reaches the top of the inside of the reaction column 2 is discharged from the top of the reaction column 2 and supplied to a gas-liquid separator 6.

In a gas-liquid separator 6, the water that is heated by passage through the cooling line 3 disposed inside the reaction column 2 is separated into water vapor (middle-pressure steam) and liquid water.

A separator 5 is connected to the central region of the reaction column 2, and separates the catalyst particles and liquid hydrocarbon products from the catalyst slurry.

The gas-liquid separator 6 is connected to the top of the reaction column 2, and cools the gas discharged from the reaction column 2, which contains unreacted mixed gas and light hydrocarbons produced by the FT synthesis reaction that exist in a gaseous state under the conditions inside the reaction column 2, thereby performing a gas-liquid separation of the discharged gas into a liquid hydrocarbon component and a gas component containing unreacted synthesis gas and gaseous hydrocarbons of $C_4$ or less.

In a fractionator 7, liquid hydrocarbons that have been supplied from the reaction column 2 via the separator 5 and the gas-liquid separator 6 are fractionally distilled into different fractions in accordance with their respective boiling points.

By using this type of FT synthesis unit 10 containing the slurry bubble column reactor 1 as the main component, hydrocarbons can be produced efficiently using the highly active activated FT synthesis catalyst of the present embodiment.

In those cases where the catalyst being used is supplied in the form of an activated FT synthesis catalyst that has been subjected to a stabilization treatment, the catalyst may be used as is, without further treatment. Even in the case of an activated FT synthesis catalyst that has been subjected to stabilization by coating with a wax or the like, the wax or the like dissolves in the hydrocarbon oil, allowing the activity of the activated FT synthesis catalyst to manifest. On the other hand, in those cases where the catalyst being used has not undergone a reduction treatment, and is supplied in the form of an FT synthesis catalyst in which the cobalt atoms are in an oxide state, the above-mentioned method for producing an activated FT synthesis catalyst according to the present invention can be used to perform a reduction treatment and produce an activated FT synthesis catalyst of the present invention, either inside the FT synthesis reaction apparatus, or inside a separate apparatus attached to the FT synthesis reaction apparatus. The thus obtained activated FT synthesis catalyst is then supplied to the reaction.

The reaction temperature may be determined in accordance with the targeted carbon monoxide conversion, but is preferably within a range from 150 to 300° C., and more preferably from 170 to 250° C.

The reaction pressure is preferably within a range from 0.5 to 5.0 MPa, and more preferably from 2.0 to 4.0 MPa. If the reaction pressure is less than 0.5 MPa, then it tends to be difficult to achieve a satisfactorily high carbon monoxide conversion, whereas if the reaction pressure exceeds 5.0 MPa, then localized heat generation tends to occur, which is undesirable.

The hydrogen gas/carbon monoxide gas ratio (molar ratio) within the feedstock gas is preferably within a range from 0.5 to 4.0, and is more preferably from 1.0 to 2.5. If this molar ratio is less than 0.5, then the reaction temperature tends to increase, causing deactivation of the catalyst, whereas if the molar ratio exceeds 4.0, then the amount of methane produced, which is an undesirable by-product, tends to increase.

The gas space velocity of the feedstock gas is preferably within a range from 500 to 5,000 $h^{-1}$, and more preferably from 1,000 to 2,500 $h^{-1}$. If this gas space velocity is less than 500 $h^{-1}$, then the productivity for an equal amount of the catalyst tends to worsen, whereas if the gas space velocity exceeds 5,000 $h^{-1}$, then achieving a satisfactory increase in the carbon monoxide conversion tends to be difficult.

By using an activated FT synthesis catalyst produced using the method of the present embodiment, the catalyst is able to exhibit a high level of activity from the initial stages of the reaction. Accordingly, a method for producing hydrocarbons according to the present invention, which uses this catalyst, is able to produce hydrocarbons with a high yield from the initial stages of the reaction.

The present invention is not limited to the preferred embodiment described above, and various modifications may be made without departing from the scope of the present invention. For example, the method for producing hydrocarbons by the FT synthesis reaction may be performed using a fixed bed reactor instead of the slurry bed reactor described above. When a fixed bed reactor is used, the catalyst that is used is preferably combined with a binder and molded into a desired shape. In this case, the catalyst may be prepared by molding a composition containing the silica-containing particles and the binder, supporting a zirconium compound on the thus obtained molded body to form a catalyst support, subsequently supporting cobalt on the catalyst support to prepare an FT synthesis catalyst, and then activating the catalyst by performing a reduction treatment. Examples of the binder include typical binders such as alumina, magnesia, boria and titania, and the amount of the binder may also be a typical amount.

EXAMPLES

The present invention is described below in further detail based on a series of examples and comparative examples, but it should be noted that the present invention is in no way limited by the examples presented below.

Example 1

(Catalyst Preparation)

30 g of spherical silica particles (average pore size: 10 nm, average particle size: 70 μm) was weighed into a 250 ml glass bottle, 100 ml of an aqueous solution of nitric acid having a pH of 6.6 was added to the bottle, and the mixture was irradiated with ultrasound for 10 minutes at 40° C. Subsequently, approximately 50 ml of the supernatant liquid was removed using a Pasteur pipette, 150 ml of an aqueous solution of ammonium tricarbonatozirconate having a concentration of 0.3 mol/L was added to the bottle, and the bottle was left to stand for 24 hours at room temperature. The mixture was then filtered using a filter paper to collect (separate) the zirconium-supporting silica particles, and these particles were washed repeatedly with ion-exchanged water until the pH of the filtrate reached a value of 7. The particles were dried under vacuum, and then calcined under an air atmosphere, yielding a catalyst support. The zirconium oxide content, based on the mass of the catalyst support, was 5.3% by mass.

Using the Incipient Wetness method, the thus obtained catalyst support was impregnated with an amount of a cobalt nitrate aqueous solution equivalent to 30.1% by mass of tricobalt tetroxide based on the total mass of the prepared FT synthesis catalyst. Following this impregnation, the particles were dried for 12 hours at 120° C., and then calcined in an air atmosphere to obtain an FT synthesis catalyst. The cobalt atoms supported on the thus obtained FT synthesis catalyst all existed as tricobalt tetroxide (cobalt oxide), and as mentioned above, the mass of this FT synthesis catalyst having tricobalt tetroxide (cobalt oxide) supported thereon was used as the basis for calculation when supporting the cobalt nitrate (cobalt compound).

The above FT synthesis catalyst was subjected to a reduction treatment under a stream of hydrogen for 7 hours at 350° C. to obtain an activated FT synthesis catalyst. The degree of reduction of the cobalt atoms within the activated FT synthesis catalyst was measured by sampling a small amount of the above-mentioned unreduced FT synthesis catalyst, subjecting the sample to a pretreatment (hydrogen reduction) inside a TPR measurement apparatus under the same reduction treatment conditions as those mentioned above, and then performing a measurement using the method described above. Further, the amount of hydrogen gas adsorption per unit mass of the catalyst at 100° C. was measured using the method described above, using a metal dispersion degree analyzer BEL-METAL-3, manufactured by Bel Japan, Inc. Moreover, the amount of hydrogen gas adsorption per unit mass of the cobalt metal at 100° C., and the value obtained by multiplying the degree of reduction of the cobalt atoms by the above amount of hydrogen gas adsorption per unit mass of the cobalt metal at 100° C. were calculated using the calculation methods described above. The results are shown in Table 1.

(FT Synthesis Reaction)

5 g of the activated FT synthesis catalyst obtained following the above reduction treatment was collected in a dry box under an inert atmosphere in order to prevent oxidation, the catalyst was transferred, together with 30 ml of cetane, to a stainless steel autoclave reactor with an internal capacity of 100 ml, and a Fischer-Tropsch synthesis reaction was performed. A mixed gas having a ratio (molar ratio) of hydrogen gas/carbon monoxide gas of 2/1 was used as the feedstock, and the reaction was initiated under conditions including a value for W (mass of catalyst)/F (flow rate of synthesis gas) of 3 g·h/mol, a temperature of 230° C., a pressure of 2.3 MPa and a stirring rate of 1,000 rpm. The gas composition at the reactor outlet was analyzed periodically by gas chromatography, and based on the resulting analysis data, the carbon monoxide conversion (CO conversion) was calculated. The result is shown in Table 1.

Example 2

With the exception of altering the temperature of the reduction treatment used for obtaining the activated FT synthesis catalyst from the FT synthesis catalyst to 330° C., an activated FT synthesis catalyst was produced in the same manner as that described for example 1. Using this activated FT synthesis catalyst, an FT synthesis reaction was then conducted in the same manner as example 1. The results are shown in Table 1.

Example 3

With the exception of altering the concentration of the aqueous solution of ammonium tricarbonatozirconate used when supporting ammonium tricarbonatozirconate on the silica particles so that the amount of supported zirconium oxide, based on the mass of the catalyst support, was 7.9% by mass, an activated FT synthesis catalyst was produced in the same manner as that described for example 1. Using this activated FT synthesis catalyst, an FT synthesis reaction was then conducted in the same manner as example 1. The results are shown in Table 1.

Example 4

With the exception of using zirconyl nitrate instead of ammonium tricarbonatozirconate for supporting zirconium on the catalyst support during preparation of the catalyst support, an activated FT synthesis catalyst was produced in the same manner as that described for example 1. Using this activated FT synthesis catalyst, an FT synthesis reaction was then conducted in the same manner as example 1. The results are shown in Table 1.

Example 5

With the exception of altering the concentration of the aqueous solution of cobalt nitrate used when supporting cobalt on the catalyst support so that the amount of supported cobalt oxide (tricobalt tetroxide) was 19.4% by mass, an activated FT synthesis catalyst was produced in the same manner as that described for example 1. Using this activated FT synthesis catalyst, an FT synthesis reaction was then conducted in the same manner as example 1. The results are shown in Table 1.

Comparative Example 1

With the exception of altering the temperature of the reduction treatment used for obtaining the activated FT synthesis catalyst from the FT synthesis catalyst to 400° C., an activated FT synthesis catalyst was produced in the same manner as that described for example 1. Using this activated FT synthesis catalyst, an FT synthesis reaction was then conducted in the same manner as example 1. The results are shown in Table 1.

Comparative Example 2

With the exception of altering the temperature of the reduction treatment used for obtaining the activated FT synthesis catalyst from the FT synthesis catalyst to 290° C., an activated FT synthesis catalyst was produced in the same manner as that described for example 1. Using this activated FT synthesis catalyst, an FT synthesis reaction was then conducted in the same manner as example 1. The results are shown in Table 1.

Comparative Example 3

With the exception of using silica particles having no zirconium oxide supported thereon as the catalyst support, an activated FT synthesis catalyst was produced in the same manner as that described for example 1. Using this activated FT synthesis catalyst, an FT synthesis reaction was then conducted in the same manner as example 1. The results are shown in Table 1.

Comparative Example 4

With the exception of altering the concentration of the aqueous solution of ammonium tricarbonatozirconate used when supporting ammonium tricarbonatozirconate on the silica particles so that the amount of supported zirconium oxide, based on the mass of the catalyst support, was 15.6% by mass, an activated FT synthesis catalyst was produced in the same manner as that described for example 1. Using this activated FT synthesis catalyst, an FT synthesis reaction was then conducted in the same manner as example 1. The results are shown in Table 1.

Comparative Example 5

With the exception of supporting the zirconium on the catalyst support via a typical Incipient Wetness method using an aqueous solution of zirconyl nitrate, instead of via the equilibrium adsorption method using an aqueous solution of ammonium tricarbonatozirconate, an activated FT synthesis catalyst was produced in the same manner as that described for example 1. Using this activated FT synthesis catalyst, an FT synthesis reaction was then conducted in the same manner as example 1. The results are shown in Table 1.

TABLE 1

|  |  | Example | | | | |
|---|---|---|---|---|---|---|
|  |  | 1 | 2 | 3 | 4 | 5 |
| Catalyst support | Zr source | Ammonium tricarbonatozirconate | Ammonium tricarbonatozirconate | Ammonium tricarbonato-zirconate | Zirconyl nitrate | Ammonium tricarbonato-zirconate |
|  | Amount of supported $ZrO_2$ based on mass of catalyst support (% by mass) | 5.3 | 5.3 | 7.9 | 5.3 | 5.3 |
| Precursor | $Co_3O_4$ (% by mass) | 30.1 | 30.1 | 30.1 | 30.1 | 19.4 |
|  | $ZrO_2$ (% by mass) | 3.7 | 3.7 | 9.2 | 3.7 | 4.3 |
|  | $SiO_2$ (% by mass) | 66.2 | 66.2 | 60.7 | 66.2 | 76.3 |
| Catalyst | Reduction conditions | 350° C. × 7 h | 330° C. × 7 h | 350° C. × 7 h | 350° C. × 7 h | 350° C. × 7 h |
|  | Co degree of reduction (%) | 87 | 84 | 78 | 83 | 88 |
|  | Amount of hydrogen adsorption (ml/g-cat, 100° C.) | 0.68 | 0.85 | 0.91 | 0.54 | 0.41 |
|  | Amount of hydrogen adsorption (ml/g-Co, 100° C.) | 3.5 | 4.6 | 5.3 | 2.9 | 3.3 |

TABLE 1-continued

|  |  | | | | | |
| --- | --- | --- | --- | --- | --- | --- |
| | ZrO$_2$/Co$_3$O$_4$ (mass/mass) | 0.12 | 0.12 | 0.31 | 0.12 | 0.22 |
| | Co degree of reduction × amount of hydrogen adsorption | 308 | 385 | 412 | 244 | 288 |
| | Co conversion (%) | 86.0 | 87.0 | 78.3 | 76.7 | 75.3 |

| | | Comparative Example | | | | |
| --- | --- | --- | --- | --- | --- | --- |
| | | 1 | 2 | 3 | 4 | 5 |
| Catalyst support | Zr source | Ammonium tricarbonatozirconate | Ammonium tricarbonatozirconate | — | Ammonium tricarbonatozirconate | Zirconyl nitrate (I.W. method) |
| | Amount of supported ZrO$_2$ based on mass of catalyst support (% by mass) | 5.3 | 5.3 | — | 15.6 | 5.3 |
| Precursor | Co$_3$O$_4$ (% by mass) | 30.1 | 30.1 | 30.0 | 26.6 | 30.1 |
| | ZrO$_2$ (% by mass) | 3.7 | 3.7 | 0 | 11.4 | 3.7 |
| | SiO$_2$ (% by mass) | 66.2 | 66.2 | 70.0 | 61.9 | 66.2 |
| Catalyst | Reduction conditions | 400° C. × 7 h | 290° C. × 7 h | 350° C. × 7 h | 350° C. × 7 h | 350° C. × 7 h |
| | Co degree of reduction (%) | 92 | 70 | 97 | 71 | 87 |
| | Amount of hydrogen adsorption (ml/g-cat) | 0.31 | 0.81 | 0.31 | 0.71 | 0.30 |
| | Amount of hydrogen adsorption (ml/g-Co, 100° C.) | 1.5 | 5.2 | 1.5 | 5.1 | 1.6 |
| | ZrO$_2$/Co$_3$O$_4$ (mass/mass) | 0.12 | 0.12 | 0 | 0.43 | 0.12 |
| | Co degree of reduction × amount of hydrogen adsorption | 140 | 367 | 141 | 364 | 136 |
| | Co conversion (%) | 72.0 | 70.0 | 71.2 | 73.1 | 73.5 |

As is evident from the results shown in Table 1, the activated FT synthesis catalyst of the present invention exhibited good dispersion of the cobalt metal particles, and as a result, the FT synthesis reaction could be performed with a high CO conversion (carbon monoxide conversion), confirming that the catalyst exhibited excellent FT synthesis reaction activity.

In contrast, the catalysts produced in comparative examples 1 to 5 each failed to satisfy the conditions required for the activated FT synthesis catalyst of the present invention, either in terms of the Co degree of reduction (the degree of reduction of the cobalt atoms) or the amount of hydrogen adsorption, and in the FT synthesis reactions performed using these catalysts, the carbon monoxide conversion was significantly lower than that observed for the activated FT synthesis catalysts of the present invention produced in examples 1 to 5.

INDUSTRIAL APPLICABILITY

The present invention relates to a Fischer-Tropsch synthesis reaction catalyst that includes a catalyst support containing a silica and zirconium oxide in an amount of 0.5 to 14% by mass based on the mass of the catalyst support, and cobalt metal and a cobalt oxide supported on the catalyst support in an amount equivalent to 10 to 40% by mass of tricobalt tetroxide based on the mass of the catalyst, wherein the degree of reduction of the cobalt atoms is within a range from 75 to 93%, and the amount of hydrogen gas adsorption per unit mass of the catalyst at 100° C. is within a range from 0.40 to 1.0 ml/g. According to this invention, hydrocarbons can be produced without using expensive metals such as rhenium.

DESCRIPTION OF THE REFERENCE SIGNS

1: Slurry bubble column reactor
2: Reaction column
3: Cooling line
4, 6: Gas-liquid separator
5: Separator
7: Fractionator
10: FT synthesis unit

The invention claimed is:

1. An activated Fischer-Tropsch synthesis reaction catalyst, comprising:
   a catalyst support comprising a silica, and zirconium oxide in an amount of 0.5 to 14% by mass based on a mass of the catalyst support, and
   cobalt metal and a cobalt oxide, which are supported on the catalyst support in an amount equivalent to 18.0 to 40% by mass of tricobalt tetroxide based on a mass of the catalyst, wherein the catalyst is formed by reducing the cobalt metal and the cobalt oxide by heating at 300 to 380° C. so that a degree of reduction of cobalt atoms, represented by formula (1) shown below, is within a range from 75 to 93%, and
   an amount of hydrogen gas adsorption per unit mass of the catalyst at 100° C. is within a range from 0.40 to 1.0 ml/g $$\text{Degree of reduction of cobalt atoms (\%)} = \frac{100 \times [\text{mass of metal cobalt atoms}]}{\text{total mass of all cobalt atoms}}. \quad (1)$$

2. The Fischer-Tropsch synthesis reaction catalyst according to claim 1, wherein an amount of hydrogen gas adsorption per unit mass of cobalt metal at 100° C. is within a range from 3.4 to 5.0 ml/g.

3. The Fischer-Tropsch synthesis reaction catalyst according to claim 1, wherein a value obtained by multiplying the degree of reduction of cobalt atoms by the amount of hydrogen gas adsorption per unit mass of cobalt metal at 100° C. is within a range from 290 to 350.

4. The Fischer-Tropsch synthesis reaction catalyst according to claim 2, wherein a value obtained by multiplying the degree of reduction of cobalt atoms by the amount of hydrogen gas adsorption per unit mass of cobalt metal at 100° C. is within a range from 290 to 350.

* * * * *